(12) United States Patent
Burger et al.

(10) Patent No.: US 8,790,081 B1
(45) Date of Patent: Jul. 29, 2014

(54) CONSTANT TORQUE PROPELLER MECHANISM

(75) Inventors: Christoph Burger, Staufen im Breisgau (DE); Roy Hartfield, Auburn, AL (US)

(73) Assignee: Auburn University, Auburn, AL (US)

( * ) Notice: Subject to any disclaimer, the term of this patent is extended or adjusted under 35 U.S.C. 154(b) by 1313 days.

(21) Appl. No.: 12/290,852

(22) Filed: Nov. 3, 2008

Related U.S. Application Data (60) Provisional application No. 61/001,688, filed on Nov. 2, 2007.

(51) Int. Cl.
*F01D 7/02* (2006.01)

(52) U.S. Cl.
USPC ............................................. 416/43; 415/30

(58) Field of Classification Search
USPC .......... 415/23, 30, 33; 416/26, 27, 38, 43, 44, 416/134 A, 140, 106, 46
See application file for complete search history.

(56) References Cited

U.S. PATENT DOCUMENTS

| | | |
|---|---|---|
| 1,887,543 A | 11/1932 | Chilton |
| 1,959,631 A | 5/1934 | Lambert |
| 2,117,674 A * | 5/1938 | Lawiey ............................ 416/43 |
| 2,134,661 A | 10/1938 | Everts ............................ 170/164 |
| 2,250,826 A | 7/1941 | Everts ............................ 170/164 |
| 2,306,135 A | 12/1942 | Mercier |
| 2,416,516 A | 2/1947 | Everts ............................ 170/162 |
| 2,417,917 A | 3/1947 | Everts ............................ 170/162 |
| 2,530,520 A | 11/1950 | Hackethal et al. ....... 170/160.58 |
| 5,226,805 A * | 7/1993 | Proven ....................... 416/132 A |
| 5,326,223 A * | 7/1994 | Speer .............................. 416/46 |
| 5,366,343 A | 11/1994 | Muller |
| 5,810,561 A | 9/1998 | Cossette |
| 7,172,392 B2 * | 2/2007 | Wastling et al. ................ 416/43 |
| 7,355,294 B2 * | 4/2008 | Teichmann ..................... 290/44 |

OTHER PUBLICATIONS

Stearns B. Heinzen et al., Passively Varying Pitch Propeller for Small UAS, AIAA Aerospace Sciences Meeting, Jan. 2010, AIAA 2010-62.
What is an Aeromatic Propeller, www.aeromatic.com.

* cited by examiner

*Primary Examiner* — Mark Tornow
(74) *Attorney, Agent, or Firm* — Haverstock & Owens LLP (57) ABSTRACT

A constant torque propeller mechanism allows a propeller to operate very efficiently in both takeoff and cruise flight conditions, which significantly improves aircraft performance. The constant torque propeller mechanism introduces a lightweight and passive propeller control system which requires no electrical power to operate, but at the same time improves the efficiency of the motor propeller combination over the flight envelope.

26 Claims, 14 Drawing Sheets

CONSTANT TORQUE PROPELLER MECHANISM

CROSS-REFERENCE TO RELATED APPLICATIONS

This application claims the benefit of U.S. Provisional Patent Application Ser. No. 61/001,688, filed Nov. 2, 2007 and entitled CONSTANT TORQUE PROPELLER MECHANISM; which is hereby incorporated herein by reference in its entirety for all purposes.

FIELD OF THE INVENTION

The present invention relates to the field of propeller mechanisms. More specifically, the present invention relates to the field of constant torque propeller mechanisms.

BACKGROUND OF THE INVENTION

Fixed pitch propellers have been used since the beginning of powered flight and are still used today because of their simplicity and weight advantage. One of the pitfalls of fixed pitch propellers is that they operate efficiently only at one propeller speed and one flight speed. Efforts on variable pitch propeller design started with the Frenchman named J. Croce-Spinelli in 1871. But it took the effort of several more inventors in different countries to bring the variable pitch propeller to aviation in the 1930's. This lead to significant aircraft performance improvements with respect to cruising speed, high altitude operations and short field takeoff ability. Later the constant speed propeller was introduced which automatically adjusts the pitch of the propeller, making it more user friendly for flight crews. The early variable pitch propellers were mechanically operated and prone to fail after a few operating hours due to material fatigue. This lead to the design of hydraulically operated variable pitch and constant speed propellers, which are still found in most of today's high performance airplanes.

The small-scale Unmanned Aerial Vehicles (UAVs), also referred to as Unmanned Aerial Systems (UASs), in military reconnaissance operations are still using fixed pitch propellers which can be exchanged based on mission requirements. The reason for the use of fixed pitch propellers is system simplicity, weight savings and unavailability of a viable alternative.

SUMMARY OF THE INVENTION

A constant torque propeller mechanism allows a propeller to operate very efficiently in both takeoff and cruise flight conditions, which significantly improves aircraft performance. The constant torque propeller mechanism introduces a lightweight and passive propeller control system which requires no electrical power to operate, but at the same time improves the efficiency of the motor propeller combination over the flight envelope.

In one aspect, an apparatus comprises a housing, a set of propeller blades coupled to the housing and a mechanism coupled to the propeller blades configured for affecting propeller pitch. The mechanism further comprises a gear configured for affecting the propeller blades, a motor gear attachment operatively coupled to the gear and a spring coupled with a motor shaft attachment, the spring configured for affecting the motor gear attachment. The spring applies a force against the motor gear attachment and the motor gear attachment moves based on the force which rotates the gear which alters the propeller pitch. The spring is configured to position the set of propeller blades to a maximum pitch when the set of propeller blades is not moving. The spring is configured to reduce the pitch to maintain a constant motor torque. The spring is configured to change the pitch when flight velocity changes. The motor shaft attachment is coupled to a motor shaft. The apparatus comprises at least one of a metal and a plastic.

In another aspect, an apparatus for changing a propeller blade pitch comprises a gear configured for altering propeller pitch, a motor gear attachment operatively coupled to the gear and a spring coupled with a motor shaft attachment, the spring configured for affecting the motor gear attachment. The spring applies a force against the motor gear attachment and the motor gear attachment moves based on the force which rotates the gear which alters the propeller pitch. The gear comprises a set of beveled gears. The gear and the motor gear attachment are at least partially enclosed in a housing. The gear is coupled to a propeller blade attachment, the propeller blade attachment configured for rotating with the gear. The propeller blade attachment is coupled to a propeller hub attachment, the propeller hub attachment configured for receiving a propeller blade. The apparatus further comprises the propeller blade coupled to the propeller hub attachment. The spring is configured to position the propeller to a maximum pitch when the propeller blade is not moving. The spring is configured to reduce the pitch to maintain a constant motor torque. The spring is configured to change the pitch when flight velocity changes. The motor shaft attachment is coupled to a motor shaft. The apparatus comprises at least one of a metal and a plastic.

In another aspect, a system improving efficiency of operation of an engine comprises a housing, a propeller blade attachment contained within the housing, a set of beveled gears partially contained within the housing, the set of beveled gears configured for altering propeller pitch by causing the propeller blade attachment to move, a motor gear attachment operatively coupled to the set of beveled gears, a motor shaft attachment configured for coupling to a motor shaft, a spring coupled with the motor shaft attachment, the spring configured for affecting the motor gear attachment and one or more propeller blades coupled to the blade attachment through a propeller hub attachment. The spring applies a force against the motor gear attachment and the motor gear attachment moves based on the force which rotates the set of beveled gears which alters the propeller pitch. The spring is configured to position the one or more propeller blades to a maximum pitch when the propeller is not moving. The spring is configured to reduce the pitch to maintain a constant motor torque. The spring is configured to change the pitch when flight velocity changes. The system comprises at least one of a metal and a plastic.

In another aspect, a method of improving efficiency of operation of an engine comprises positioning propeller blades to a pitch with a constant torque spring, reducing the pitch to maintain a constant motor torque and automatically changing the pitch with the constant torque spring when flight velocity changes. The propeller blades are positioned to a maximum pitch. The constant torque spring applies a force against a motor gear attachment and the motor gear attachment moves based on the force which rotates a set of beveled gears which alters the pitch of the propeller blades. The motor gear attachment, the set of beveled gears and the propeller blades comprise at least one of a metal and a plastic.

DETAILED DESCRIPTION OF THE PREFERRED EMBODIMENT

A design of a constant torque propeller which changes the propeller pitch automatically based on flight condition allows the aircraft to operate at high propeller and motor efficiencies throughout the flight envelope, thus improving range, endurance or cruising speed.

Figure 1:
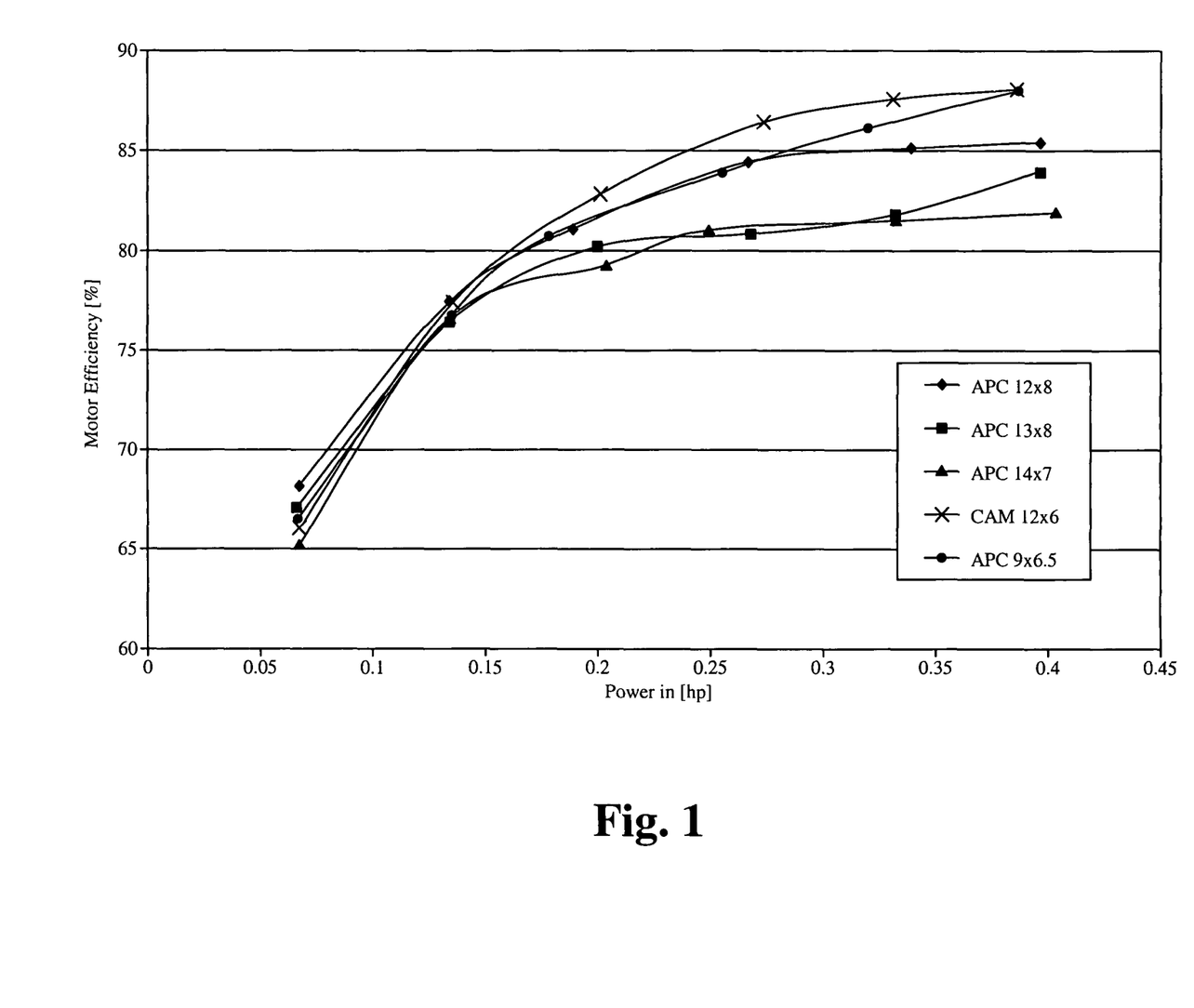
FIG. 1 illustrates a graph of power versus motor efficiency of a Hacker A30-10XL at takeoff condition.
Figure 2:
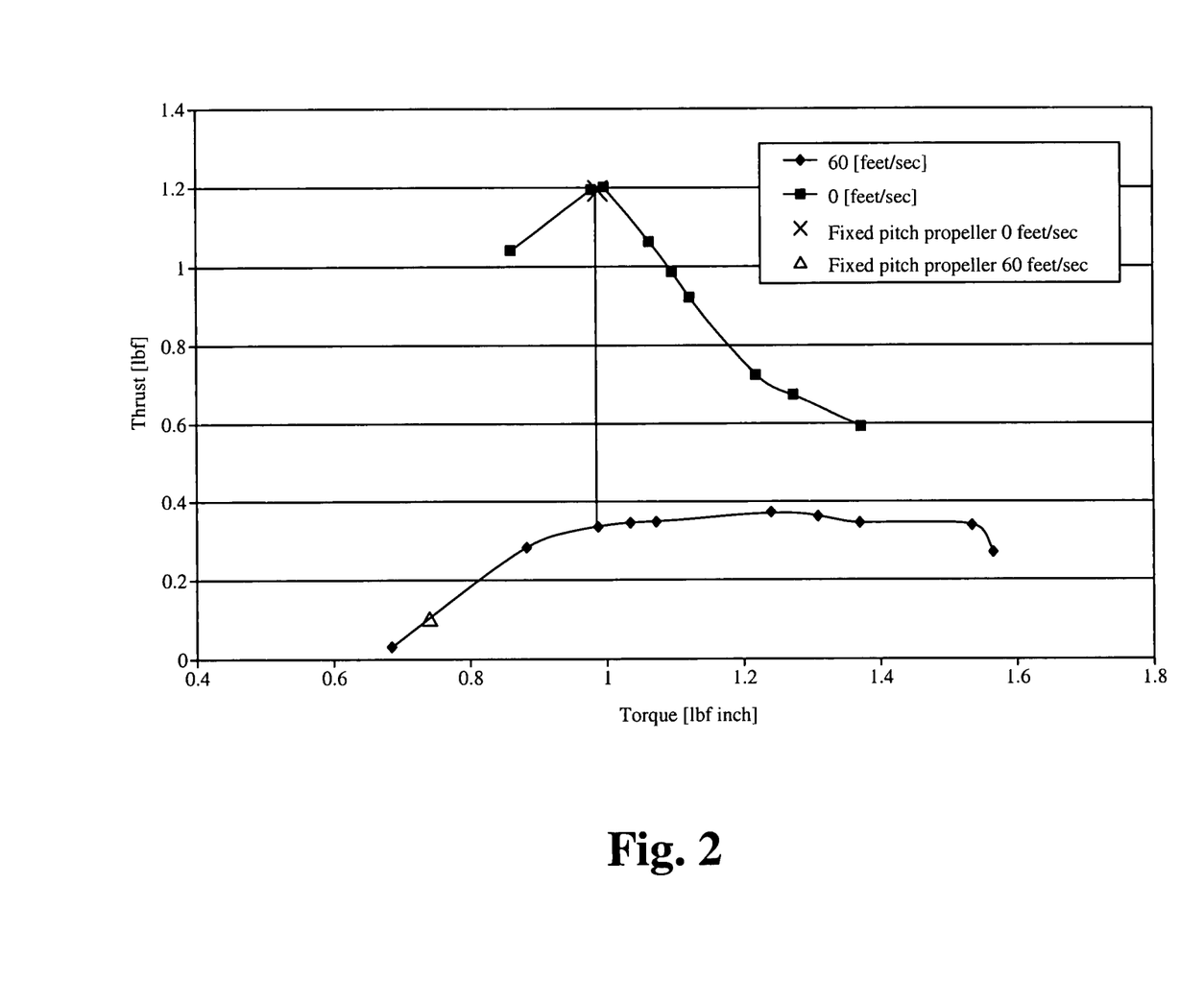
FIG. 2 illustrates a graph of propeller thrust and torque at zero and 60 [feet/sec] velocity.

Both the variable pitch and constant speed propellers need a controller to operate the propeller based on aircraft flight condition. Applied to Unmanned Aerial Vehicles (UAVs), this means an additional system must be added, which adds to the overall complexity and weight of the aircraft. The constant torque propeller introduces a lightweight and passive propeller control system which requires no electric power to operate, but at the same time improves the efficiency of the motor propeller combination over the flight envelope. It is able to be seen from the data presented in FIG. 1, that if an appropriate propeller for a given electric motor (For example, Hacker A30-10XL) is selected, high motor efficiency levels are able to be obtained. If the motor power is kept constant over the entire flight envelope, the operating point of the motor is able to be kept at a high efficiency level thus improving flight endurance and range. For the takeoff condition when higher power levels are needed, motor efficiency will drop, but only for a short time until the cruise condition is established. A wind tunnel test with a variable pitch CAM 13×7 propeller was conducted to investigate maximum thrust at static condition and 60 [feet/sec] flight velocity. FIG. 2 shows a very distinct thrust peak at 1 [lbf in] torque while the thrust torque slope at 60 [feet/sec] velocity is rather flat with a maximum thrust at about 1.25 [lbf in]. By choosing a constant torque spring with approximately 1.0 [lbf in], the thrust is able to be maximized for static conditions while thrust levels in a forward flight condition are maintained at close to the maximum obtainable thrust for that flight condition. In some embodiments, the strength of the spring is optimized based on the strength of the motor or other characteristics.

Figure 3:
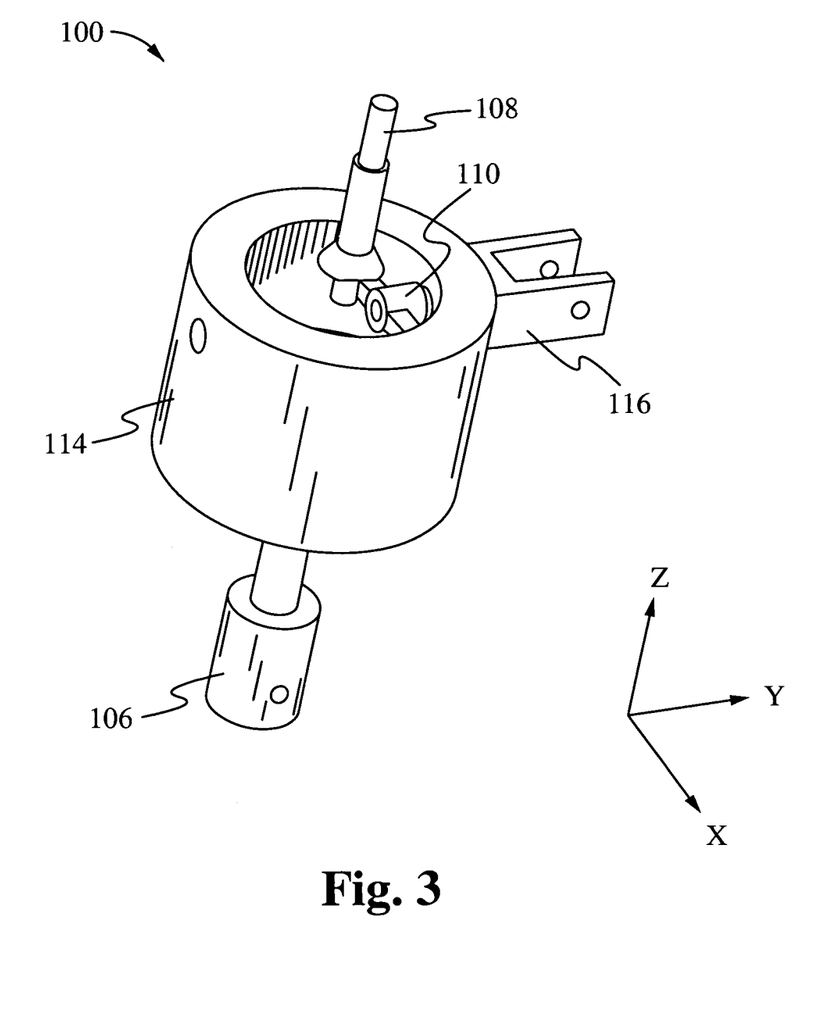
FIG. 3 illustrates an isometric view of constant torque propeller components.

For the design described herein, the pitch of the propeller is adjusted using a constant torque spring. FIG. 3 illustrates an isometric view of constant torque components. The system includes a mechanical propeller blade pitch change mechanism 100 which uses a set of beveled gears 102 and a constant torque spring 104 which is coupled to a motor shaft attachment 106 as shown in FIGS. 3-7. A motor gear attachment 108 is coupled to a propeller blade attachment 110. In some embodiments, the motor gear attachment 108 is coupled to the propeller blade attachment 110 via one or more ball bearings (such as two ball bearings) to allow for free rotation. Propeller blades 112 are coupled to a blade attachment housing 114 (also referred to as the gear housing) through a propeller hub attachment 116 which passes through a bushing with a thrust washer on the inside to allow free rotation. Although only one propeller hub attachment 116 is shown, a second propeller hub attachment 116 is included on the opposite side of the blade attachment housing. The motor gear attachment 108 is coupled to the motor shaft attachment 106 and the spring 104. The motor shaft attachment 106 is coupled to a motor. The components of the propeller blade pitch change mechanism 100 are able to be any appropriate material such as a metal or a plastic.

Figure 4:
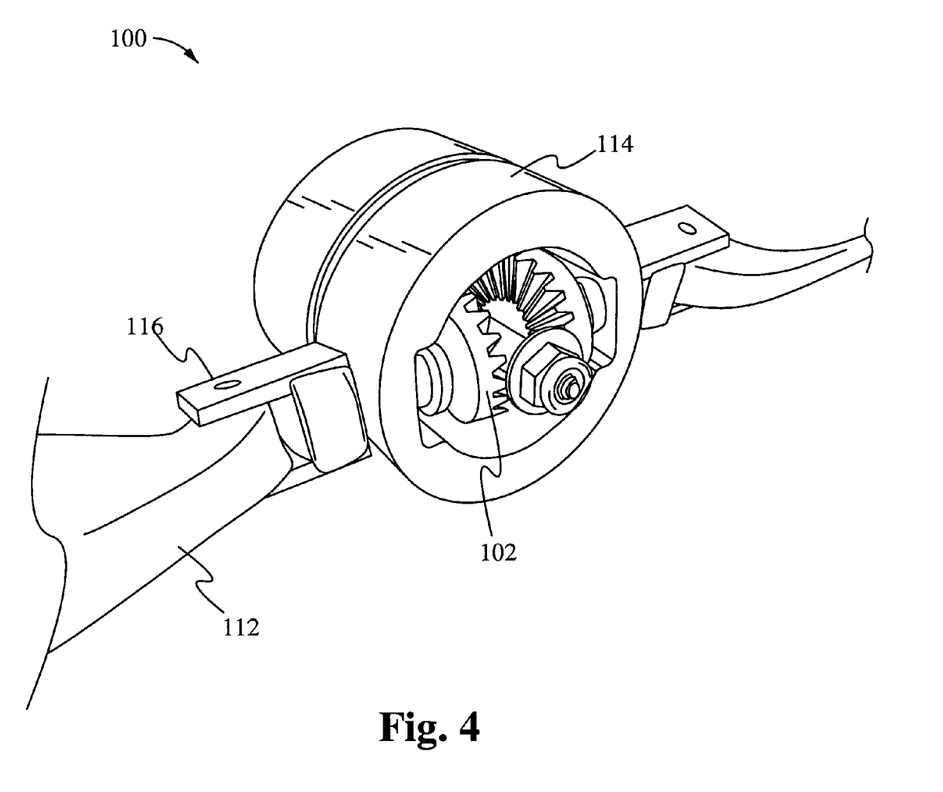
FIG. 4 illustrates a top view of the constant torque propeller components.

FIG. 4 illustrates a close-up top view of the constant torque propeller pitch change mechanism 100. The propeller blades 112 are coupled to the beveled gear set 102 through the propeller hub attachments 116. The beveled gear set 102 is contained within the blade attachment housing 114.

Figure 5:
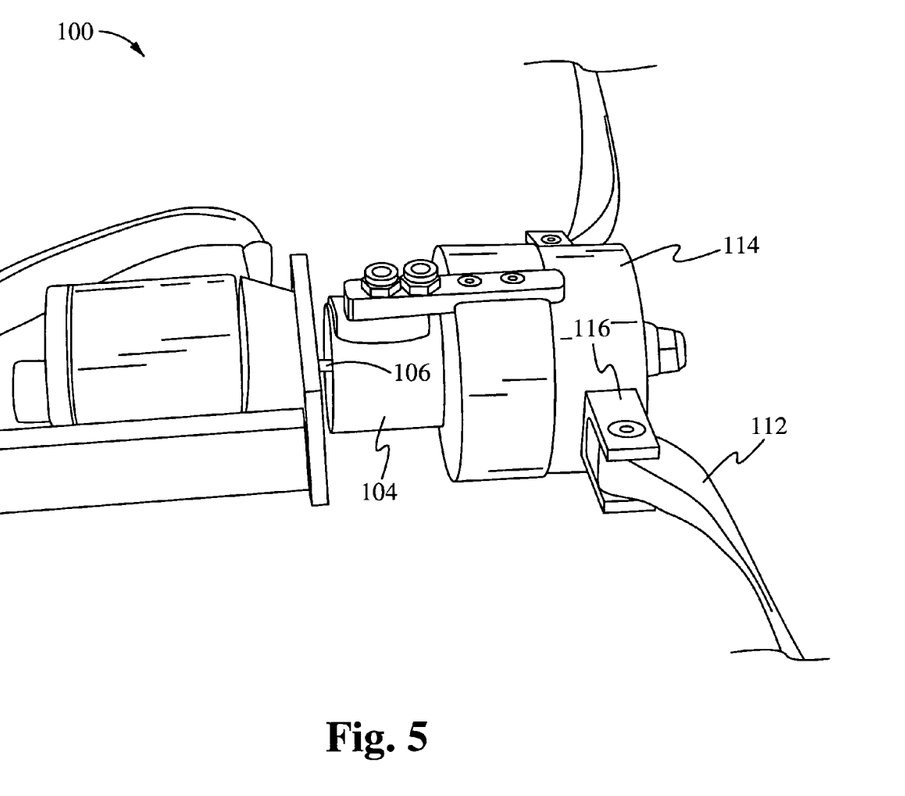
FIG. 5 illustrates a side view of the constant torque propeller components.

FIG. 5 illustrates a side view of the constant torque propeller pitch change mechanism 100. The propeller blades 112 are coupled to the blade attachment housing 114 through the propeller hub attachments 116. The motor shaft attachment 106 is shown with the torque spring 104 in position. The torque spring 104 applies a force against the motor gear attachment 108 which affects the gears 102 by moving them in one direction or another which then affects the propeller blade attachment 110 by moving the propeller blade attachment 110 one way or another.

Figure 6:
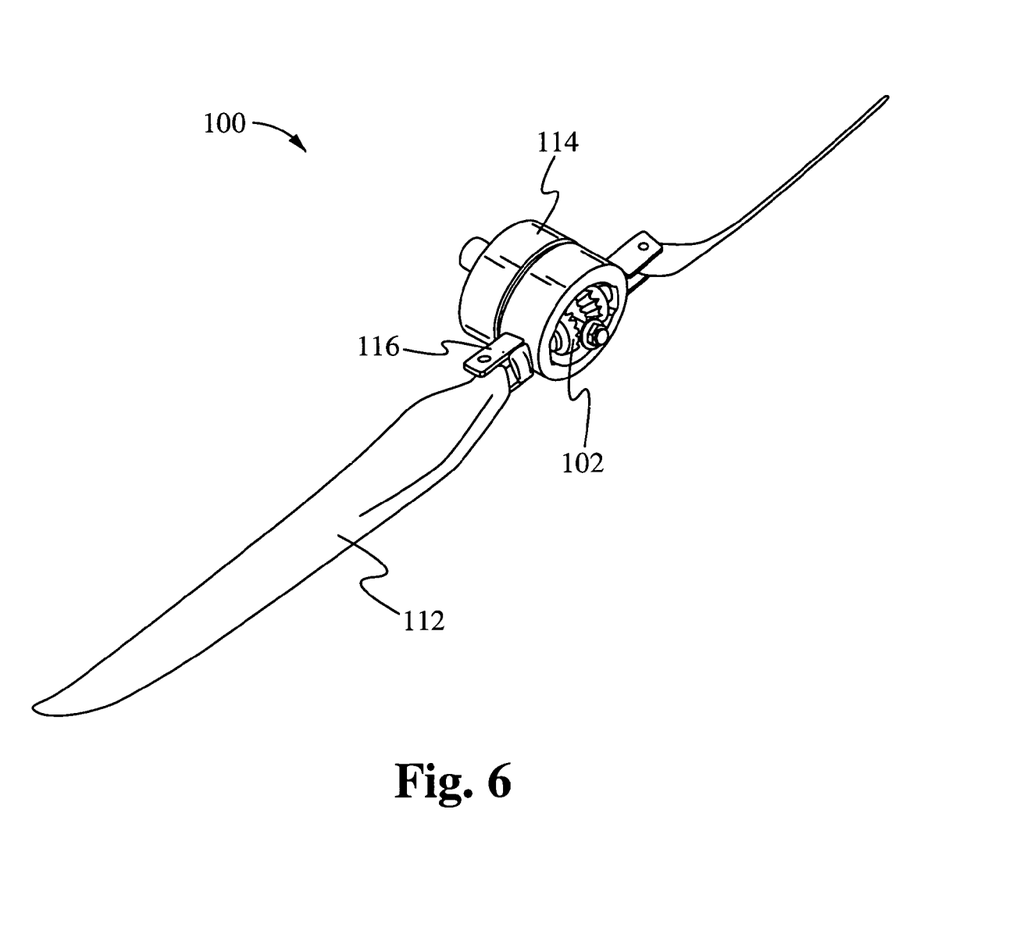
FIG. 6 illustrates a perspective view of the constant torque propeller components.

FIG. 6 illustrates a perspective view of the constant torque propeller pitch change mechanism 100. The propeller blades 112 are coupled to the blade attachment housing 114 through the propeller hub attachments 116. The beveled gear set 102 is contained within the blade attachment housing 114.

Figure 7:
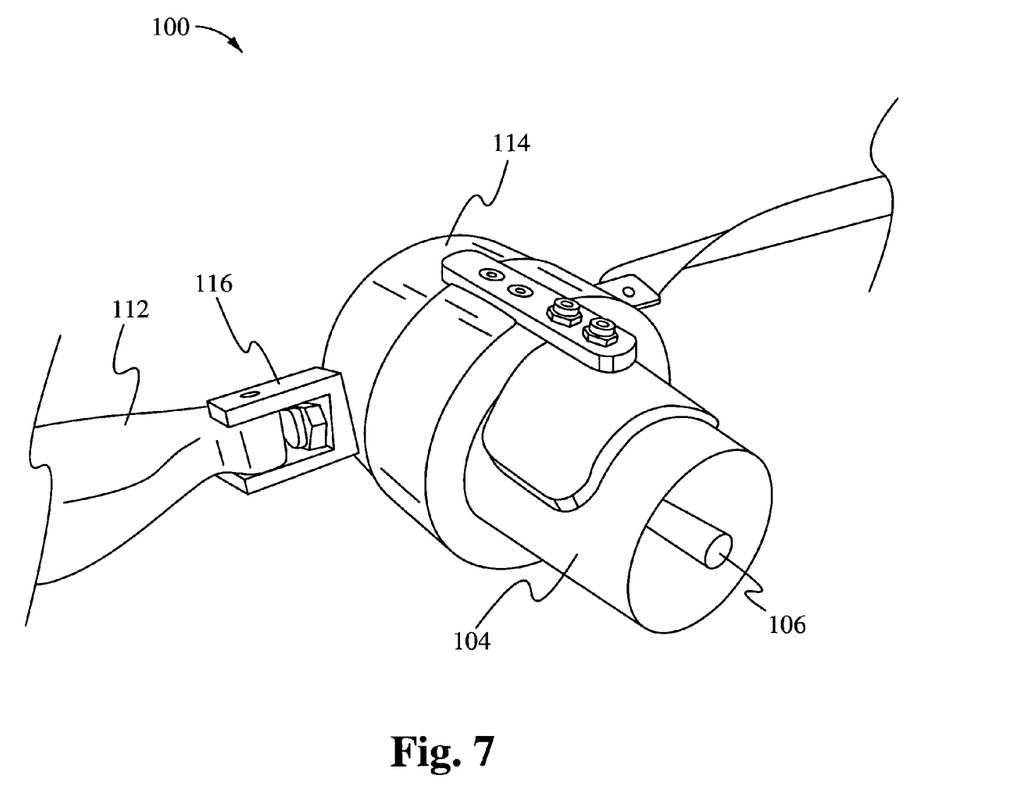
FIG. 7 illustrates a bottom view of the constant torque propeller components.

FIG. 7 illustrates a bottom view of the constant torque propeller pitch change mechanism 100. The propeller blades 112 are coupled to the blade attachment housing 114 through the propeller hub attachments 116. The torque spring 104 is shown on the motor shaft attachment 106 which enters the bottom of the blade attachment housing 114.

Figure 8:
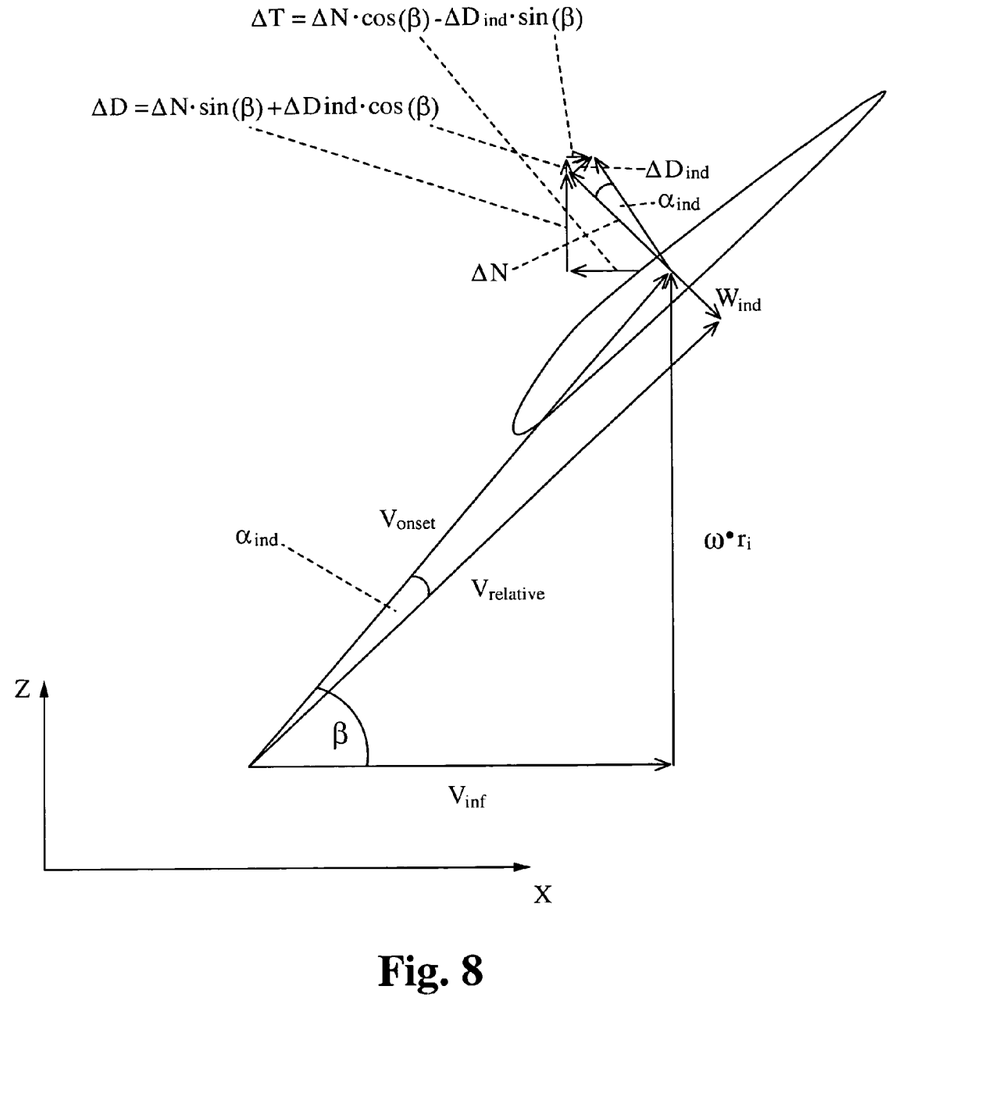
FIG. 8 illustrates a diagram of propeller lift and drag for different blade angles at constant propeller speed.

In a static condition when the propeller is not spinning the constant torque spring 104 positions the propeller blades 112 at the maximum allowable pitch setting which is limited through mechanical stops. As soon as the propeller starts turning and the free stream velocity is kept at zero, the torque builds up until it reaches the torque of the constant torque spring 104. This is due to the fact that when the propeller rotates, drag is mainly a function of the propeller lift which depends on the propeller angle of attack and propeller speed. FIG. 8 illustrates a graph of propeller lift and drag for different blade angles at a constant propeller speed. As power continues to increase, the pitch of the propeller blades is reduced to maintain the constant motor torque. In a cruise condition the load on the propeller is reduced for a fixed pitch propeller due to the increased free stream velocity, which lowers the propeller torque. For the constant torque propeller this means that as soon as the blade torque is reduced, the constant torque spring 104 rotates the propeller blades 112 to a higher pitch setting until the motor torque equals the spring torque. Any time the flight velocity changes, the constant torque spring 104 changes the pitch of the propeller blades 112 to accommodate torque balance.

Wind Tunnel Results

Figure 9:
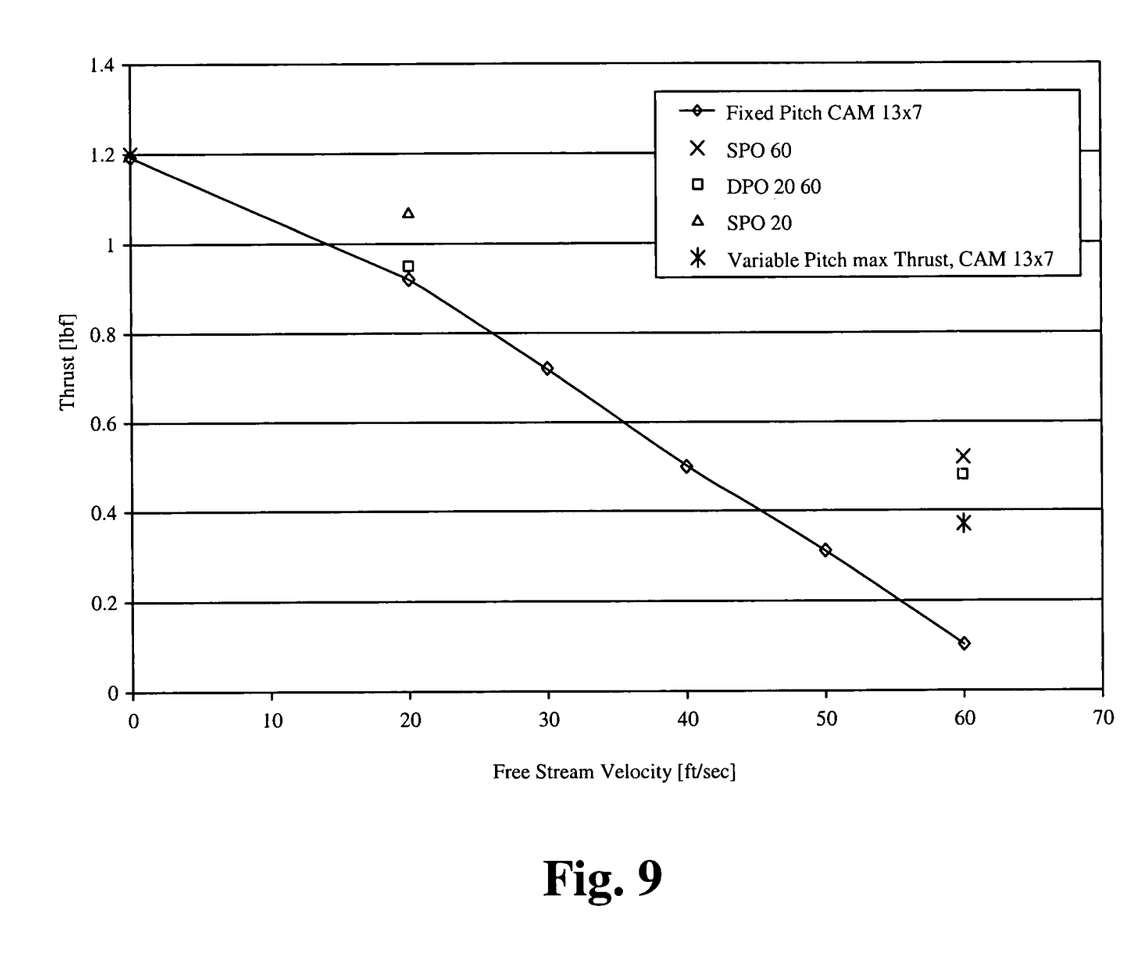
FIG. 9 illustrates a graph of thrust of a fixed pitch propeller and variable pitch propeller at P=0.9 Hp.

To validate the benefits of a variable pitch propeller against a fixed pitch propeller the variable pitch propeller was tested in a fixed pitch mode at a constant power setting of P=0.09 [hp] from zero to 60 [feet/sec] free stream velocity. The same setup was then tested with the variable pitch propeller at zero and at 60 [feet/sec]. FIG. 9 shows that at zero free stream velocity the variable pitch propeller matches the thrust of the fixed pitch propeller which demonstrates that the CAM 13×7 propeller is optimized for maximum thrust at zero forward flight condition. At 60 [feet/sec] free stream velocity the fixed pitch propeller produces about 0.1 [lbf] of thrust, while the variable pitch propeller produced 0.37 [lbf] of thrust. The maximum thrust data for the variable pitch propeller was obtained by changing the spring tension manually and observing the thrust produced. This is also evidenced in FIG. 2.

Even though the variable pitch propeller produces more thrust at 60 [ft/sec] free stream velocity as compared to a fixed pitch propeller, it does not reach the thrust levels of the static condition. This typical result is due to the fact that power is a function of the free stream velocity and thrust.

$$P = T \cdot v_{inf}$$

In a second test, the same CAM 13×7 propeller was tested in the wind tunnel from zero to ~65 [ft/sec] free stream velocity. The first test run was done in a fixed pitch propeller mode at a constant power of 0.076 [hp] and the second at the same power setting with the constant torque spring propeller setup. The performance advantage of the constant torque propeller is clearly observable in the different thrust slopes of the propeller configurations of FIG. 10.

Propeller Performance Optimization

To further improve the overall efficiency of the constant torque propeller, a propeller performance prediction program, based on the vortex lattice method, in combination with a genetic algorithm (GA) was used to optimize the propeller blade design.

For the blade shape, Bernstein polynomials and class shape functions are used to parameterize the outer mold line of the airfoil. This approach is employed such that only aerodynamic airfoil shapes are considered. No consideration is given to structural design in this study. A rudimentary flow separation model was included in this analysis; however, no viscous effects were considered.

The optimizer is a binary encoded tournament method GA with pareto capability. A population size of 400 members was used and the optimization process was carried out to several hundred generations in most cases.

Optimization Results

The CAM 13×7 propeller diameter, chord length and propeller speed was used as fixed input parameters for the optimization. The objective function was set to match a power setting of 0.09 [hp] and at the same time maximize the thrust of the propeller. Table 1 shows the thrust of the three different optimizations and the results from the experiments. The first and second optimizations used a single free stream velocity (SPO) of 20 ft/sec and 60 ft/sec. In the third optimization, both the 20 and 60 ft/sec free stream velocity propeller operating condition was considered in the objective function (DPO). The fixed pitch CAM 13×7 propeller generates the least amount of thrust at a cruise condition of 60 [ft/sec], followed by the variable pitch propeller. The best performing propellers are the SPO optimized shapes followed the DPO propeller.

TABLE 1

Thrust performance of different propellers at P = 0.09 [hp]

| Propeller Type | Thrust [lbt] |
|---|---|
| Fixed Pitch Propeller | 0.1 |
| Variable Pitch Propeller | 0.36 |
| 1 Optimized Propeller | 1.07 |
| 2 Optimized Propeller | 0.52 |
| 3 Optimized Propeller | 0.48 0.95 |

Figure 10:
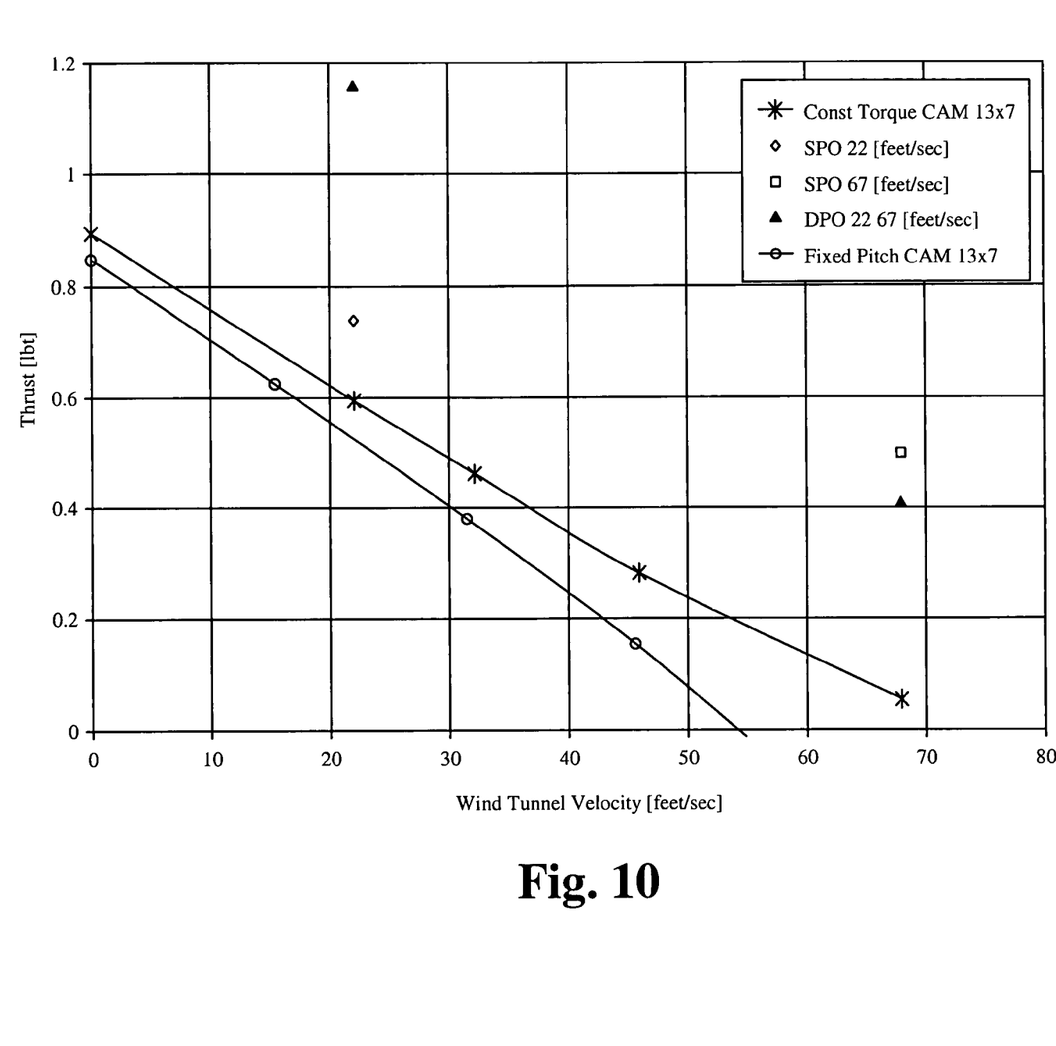
FIG. 10 illustrates a graph of thrust of a fixed pitch propeller and variable pitch propeller at P=0.071-0.076 Hp.

In a second optimization an updated version of the propeller performance program was used. The change in the program included an extended design space for the propeller geometries. Single (SPO) and dual (DPO) point optimizations which match the power input and RPM of a second wind tunnel test were done. Even though the constant torque propeller shows superior performance as compared to the fixed pitch propeller setup, significant improvements are able to be obtained with an optimized propeller blade. FIG. 10 shows a single point optimization (SPO) for a free stream velocity of Vinf=22 [ft/sec] with a thrust improvement of about 25% when compared to the constant torque propeller. At the higher free stream velocity of 67 [ft/sec] the thrust improvements are even more significant. No experimental investigation has been done to maximize the thrust of the constant torque propeller setup for the power input of 0.071-0.076 Hp. The dual point optimization (DPO) for both 22 and 67 [ft/sec] free stream velocity shows that in the cruise condition the propeller thrust is lower when compared to SPO but shows significant improvements to the constant torque CAM 13×7 propeller. At the low free stream velocity the propeller performance program overpredicts the propeller thrust. This is due to the fact that flow separations are not fully taken into account in the DPO run. In the SPO, the flow separation is considered by limitation of the inflow (max 5 deg) and the downwash angle (max 10 deg).

Figure 11:
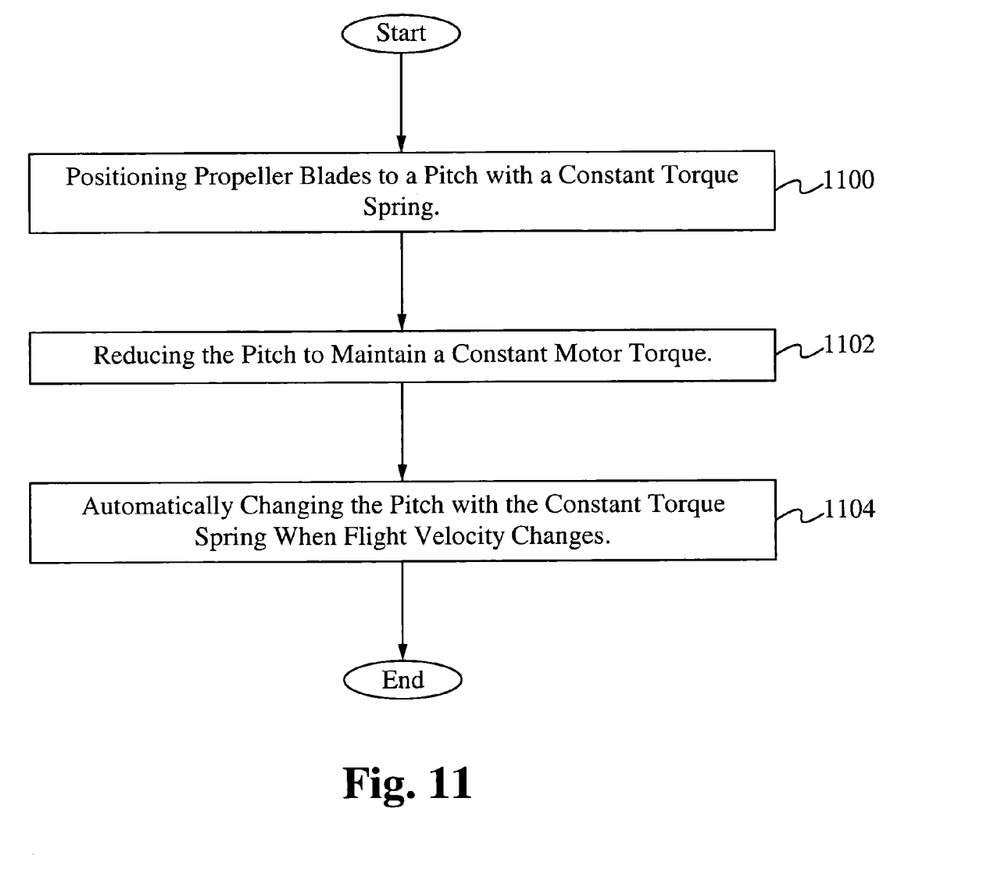
FIG. 11 illustrates a flowchart of a method of implementing a constant torque propeller.

FIG. 11 illustrates a flowchart of a method of implementing a constant torque propeller. In the step 1100, in a static condition when the propeller is not spinning the constant torque spring 104 positions the propeller blades 112 at the maximum allowable pitch setting which is limited through mechanical stops. As soon as the propeller starts turning and the free stream velocity is kept zero, the torque builds up until it reaches the torque of the constant torque spring 104. In the step 1102, as power continues to increase, the pitch of the propeller blades is reduced by the constant torque spring to maintain the constant motor torque. In a cruise condition the load on the propeller is reduced for a fixed pitch propeller due to the increased free stream velocity, which lowers the propeller torque. For the constant torque propeller, this means that as soon as the blade torque is reduced, the constant torque spring 104 rotates the propeller blades 112 to a higher pitch setting until the motor torque equals the spring torque, in the step. Any time the flight velocity changes, the constant torque spring 104 automatically changes the pitch of the propeller blades 112 to accommodate torque balance, in the step 1104.

Figure 12A:
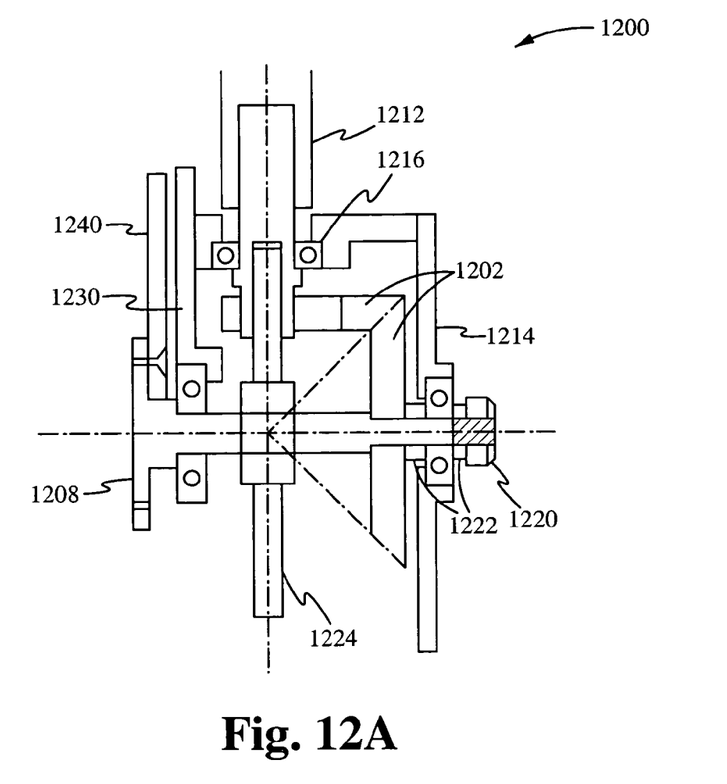
FIGS. 12A-D illustrate a graphical diagram of components of an embodiment of the constant torque propeller components.

FIGS. 12A-D illustrate a graphical diagram of components of an embodiment of the constant torque propeller components. FIG. 12A illustrates a cross section view of the constant torque propeller components 1200. The components 1200 include a set of gears 1202, a constant torque spring 1204 (FIG. 12C) and an engine shaft attachment 1208. In some embodiments, some or all of the components are enclosed in a housing 1214. In some embodiments, a lock nut 1220 and a set of washers 1222 are used to couple the engine shaft attachment 1208 with the housing 1214. A propeller blade 1212 is coupled to the housing 1214. In some embodiments, the propeller blade 1212 is coupled to the housing 1214 by a propeller hub attachment 1216. A yoke 1224 is also included in the components 1200. The yoke 1224 includes an aperture for receiving the engine shaft attachment 1208. The yoke 1224 is coupled to the propeller blade 1212. A spinner mount plate 1230 includes an aperture to allow the engine shaft attachment 1208 to fit through. The spinner mount plate 1230 includes one or more constant torque springs 1204 which couple to an engine mount plate 1240. The components 1200 are able to be any appropriate material such as a metal or a plastic. As described above, the constant torque springs force the propeller pitch to a more efficient position.

Figure 12B:
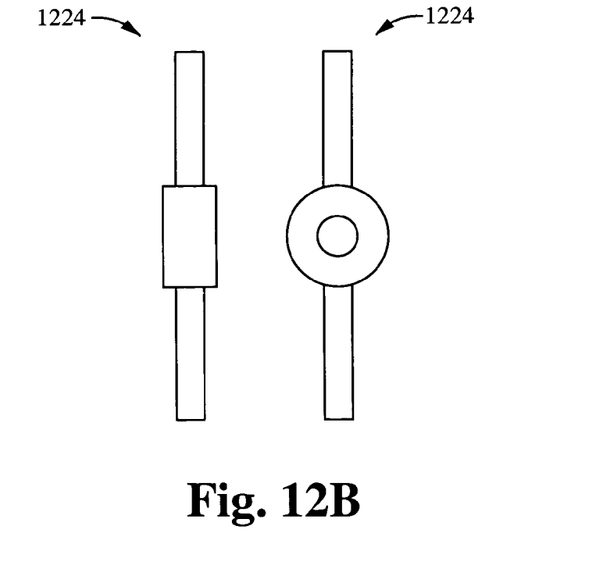

FIG. 12B illustrates a front view and a side view of a yolk 1224. As described above, the yolk 1224 is configured to receive the engine shaft attachment 1208 (FIG. 12A). The yolk 1224 is also configured to couple to the propeller blade to take propeller moments.

Figure 12C:
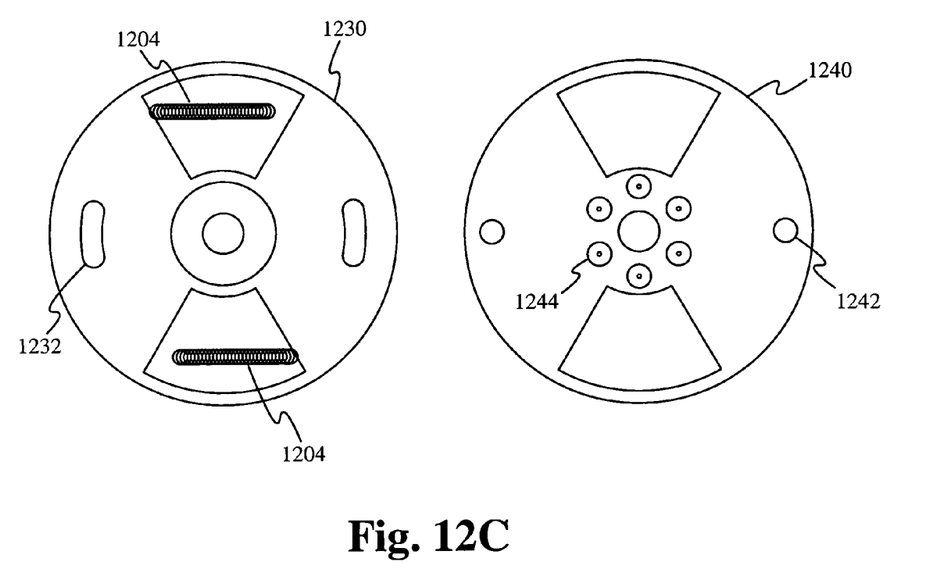
Figure 12D:
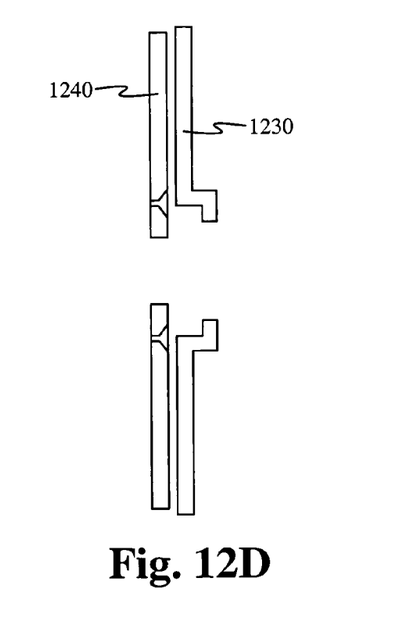

FIG. 12C illustrates a front view of a spinner mount plate 1230 and an engine mount plate 1240. The spinner mount plate 1230 includes cavities for one or more constant torque springs 1204 to operate. In some embodiments, the spinner mount plate 1232 also includes slots for a stop travel mechanism. The engine mount plate 1240 includes pins 1242 for a stop travel mechanism. The engine mount plate 1240 also includes holes 1244 for engine attachment screws. The engine mount plate 1240 also includes cavities for the one or more constant torque springs 1204 to operate. FIG. 12D illustrates a side cross-sectional view of the spinner mount plate 1230 and the engine mount plate 1240. The constant torque springs 1204 are able to be fitted to generate approximately any desired force distribution, for example, more torque at takeoff and less torque at cruise speed.

Figure 13:
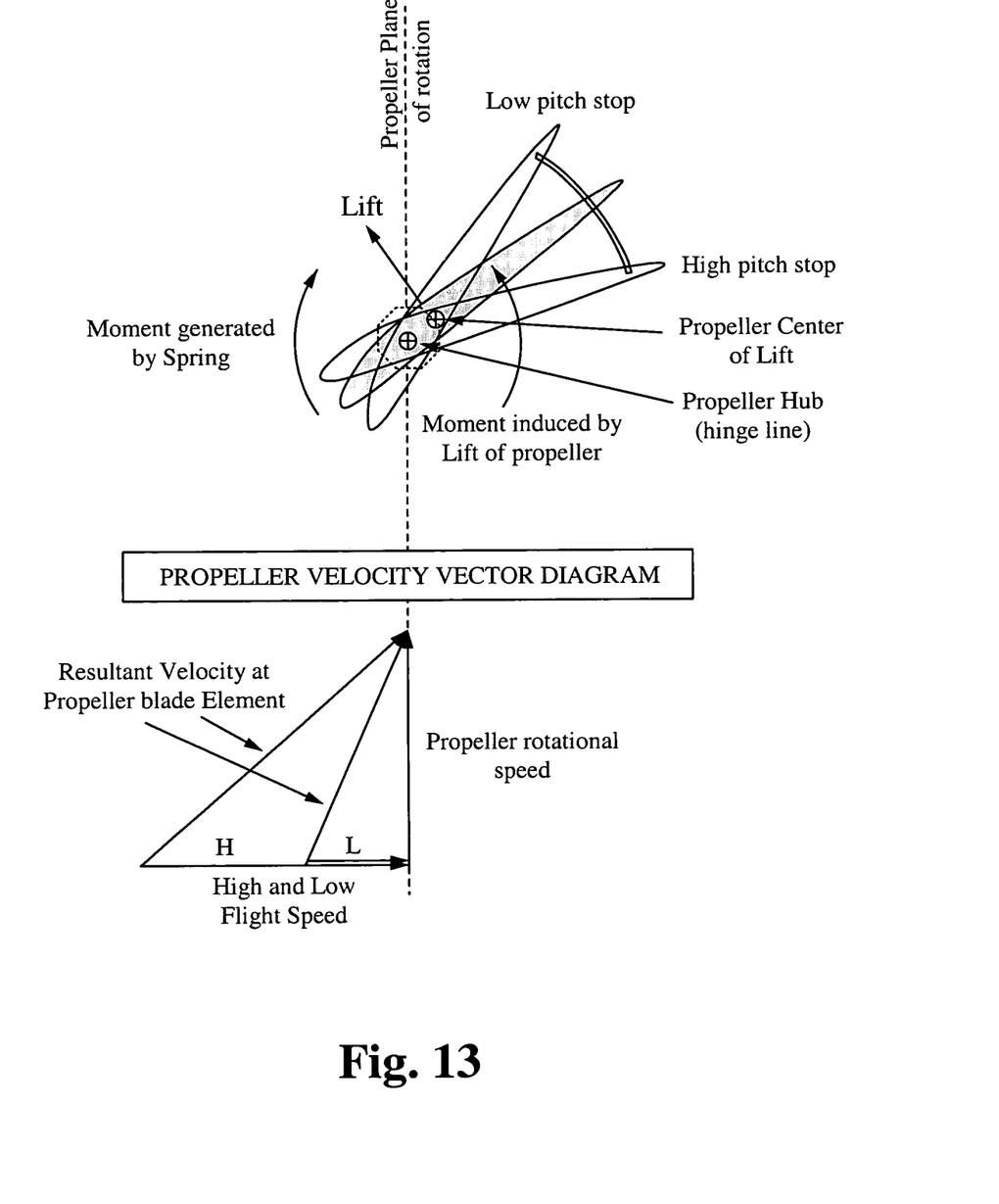
FIG. 13 illustrates a diagram of propeller kinematics.

FIG. 13 illustrates a diagram of propeller kinematics. The center of lift of the propeller blade is behind the propeller hub center (hinge line) to assure that it opposes the moment generated by the constant force spring. This assures that when lift is reduced due to increased altitude or airspeed, that the spring pushes the propeller blade to a higher pitch setting to match blade load and spring moment.

CONCLUSIONS

A device which is able to passively practically maintain constant aerodynamic loading on propeller blades through a range of operating conditions has been designed, tested and optimized. The experimental results demonstrate that substantial performance improvement is able to be obtained using this simple, passive device. Planned improvements to the optimization results include the addition of a more sophisticated flow separation model, the implementation of a two-layer vortex lattice model, the inclusion of viscous effects and the addition of a cowl for certain ducted fan applications.

To utilize the constant torque propeller mechanism, the constant torque propeller mechanism is coupled with a motor of a flying device such as a UAV. Before the UAV starts spinning the propellers, which is referred to as being in a static condition, the constant torque spring positions the propeller blades at the maximum allowable pitch setting by applying a force on a gear attachment which configures the gears accordingly which configures the propeller blades accordingly. In some embodiments, the position of the blades is limited through mechanical stops. As soon as the propeller starts turning and the free stream velocity is kept zero, the torque builds up until it reaches the torque of the constant torque spring. As power continues to increase, the pitch of the propeller blades is reduced to maintain the constant motor torque. The pitch of the propeller blades is reduced by the force pushing back against the spring. In a cruise condition the load on the propeller is reduced for a fixed pitch propeller due to the increased free stream velocity, which lowers the propeller torque. For the constant torque propeller, this means that as soon as the blade torque is reduced, the constant torque spring rotates the propeller blades to a higher pitch setting until the motor torque equals the spring torque, in the step. Any time the flight velocity changes, the constant torque spring automatically changes the pitch of the propeller blades to accommodate torque balance. As described above, the spring applies a force or has a force applied against the spring to alter the pitch of the propeller blades.

In operation, the constant torque propeller mechanism allows a propeller to operate very efficiently in both takeoff and cruise flight conditions, which significantly improves aircraft performance. The constant torque propeller mechanism introduces a lightweight and passive propeller control system which requires no electrical power to operate, but at the same time improves the efficiency of the motor propeller combination over the flight envelope. Another advantage of the constant torque propeller is that older airplanes are able to be retrofitted easily with this technology. Other technologies which require more hardware to be implemented do not lend themselves well for retrofitting. The constant torque propeller mechanism design is able to be configured such that the blade loading is proportional to engine torque (rather than operating speed). This is a substantial advantage over an aeromatic propeller especially when operating at different flight altitudes.

For the constant torque drive mechanism, the pitch of the propeller at a high or maximum power setting, normally used for takeoff and climb, is up against the low pitch stops which will provide the maximum thrust. This is due to the fact that the propeller blade loading is higher that the torque generated by the spring. As forward flight speed increases, propeller blade loading will decrease up to where it matches the moment provided by the spring. At this point, if flight speed rises any further, the spring will increase the blade pitch angle to keep the blade loading constant. As altitude increases, blade loading will also reduce due to the lower air density at altitude. When the propeller blade loading matches the torque of the spring, the propeller blade pitch will increase. As altitude increases even further the spring will keep the propeller loading constant by increasing the propeller blade pitch. This will continue until finally the high pitch limit stops are reached. This point is able to be set as required for the application but for at least 10,000 ft and greater than 100 mph depending on the details of the mechanism.

In alternative embodiments, the position of the propeller with respect to the blade of the wing is able to be moved to generate torque in opposite direction thus causing the engine to act more like a constant speed propeller.

The present invention has been described in terms of specific embodiments incorporating details to facilitate the understanding of principles of construction and operation of the invention.

Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. An airplane propeller apparatus comprising:
   a. a housing;
   b. a set of propeller blades coupled to the housing;

c. a mechanism coupled to the propeller blades configured for affecting propeller pitch; and
d. a spring in communication with the set of propeller blades such that the spring is able to bias the set of propeller blades to a maximum pitch when the set of propeller blades is not moving, further wherein the spring is configured to automatically change the pitch of the set of propeller blades.

2. The apparatus of claim 1 wherein the mechanism further comprises:
a. a gear configured for affecting the propeller blades;
b. a motor gear attachment operatively coupled to the gear; wherein the spring is coupled with a motor shaft attachment, the spring configured for affecting the motor gear attachment.

3. The apparatus of claim 2 wherein the spring applies a force against the motor gear attachment and the motor gear attachment moves based on the force which rotates the gear which alters the propeller pitch.

4. The apparatus of claim 2 wherein the spring is configured to reduce the pitch to maintain a constant motor torque.

5. The apparatus of claim 2 wherein the spring is configured to change the pitch when flight velocity changes.

6. The apparatus of claim 2 wherein the motor shaft attachment is coupled to a motor shaft.

7. The apparatus of claim 1 wherein the apparatus comprises at least one of a metal and a plastic.

8. An apparatus for changing an airplane propeller blade pitch comprising:
a. a gear configured for altering propeller pitch;
b. a motor gear attachment operatively coupled to the gear; and
c. a spring coupled with a motor shaft attachment, the spring configured for affecting the motor gear attachment;
wherein the spring is configured to position the propeller to a maximum pitch when the propeller blade is not moving, further wherein the spring automatically changes the pitch of the propeller.

9. The apparatus of claim 8 wherein the spring applies a force against the motor gear attachment and the motor gear attachment moves based on the force which rotates the gear which alters the propeller pitch.

10. The apparatus of claim 8 wherein the gear comprises a set of beveled gears.

11. The apparatus of claim 8 wherein the gear and the motor gear attachment are at least partially enclosed in a housing.

12. The apparatus of claim 8 wherein the gear is coupled to a propeller blade attachment, the propeller blade attachment configured for rotating with the gear.

13. The apparatus of claim 12 wherein the propeller blade attachment is coupled to a propeller hub attachment, the propeller hub attachment configured for receiving a propeller blade.

14. The apparatus of claim 13 further comprising the propeller blade coupled to the propeller hub attachment.

15. The apparatus of claim 8 wherein the spring is configured to reduce the pitch to maintain a constant motor torque.

16. The apparatus of claim 8 wherein the spring is configured to change the pitch when flight velocity changes.

17. The apparatus of claim 8 wherein the motor shaft attachment is coupled to a motor shaft.

18. The apparatus of claim 8 wherein the apparatus comprises at least one of a metal and a plastic.

19. A system improving efficiency of operation of an airplane engine comprising:
a. a housing;
b. an airplane propeller blade attachment contained within the housing;
c. a set of beveled gears partially contained within the housing, the set of beveled gears configured for altering propeller pitch by causing the propeller blade attachment to move;
d. a motor gear attachment operatively coupled to the set of beveled gears;
e. a motor shaft attachment configured for coupling to a motor shaft;
f. a spring coupled with the motor shaft attachment, the spring configured for affecting the motor gear attachment; and
g. one or more propeller blades coupled to the blade attachment through a propeller hub attachment;
wherein the spring is configured to position the one or more propeller blades to a maximum pitch when the propeller is not moving, further wherein the spring automatically changes the pitch of the one or more propeller blades.

20. The system of claim 19 wherein the spring applies a force against the motor gear attachment and the motor gear attachment moves based on the force which rotates the set of beveled gears which alters the propeller pitch.

21. The system of claim 19 wherein the spring is configured to reduce the pitch to maintain a constant motor torque.

22. The system of claim 19 wherein the spring is configured to change the pitch when flight velocity changes.

23. The system of claim 19 wherein the system comprises at least one of a metal and a plastic.

24. A method of improving efficiency of operation of an airplane engine comprising:
a. biasing airplane propeller blades to a maximum pitch when at rest with a constant torque spring;
b. reducing the pitch to maintain a constant motor torque; and
c. automatically changing the pitch with the constant torque spring when flight velocity changes, wherein blade loading is proportional to engine torque.

25. The method of claim 24 wherein the constant torque spring applies a force against a motor gear attachment and the motor gear attachment moves based on the force which rotates a set of beveled gears which alters the pitch of the propeller blades.

26. The method of claim 25 wherein the motor gear attachment, the set of beveled gears and the propeller blades comprise at least one of a metal and a plastic.

* * * * *